(12) United States Patent
Bradbrook

(10) Patent No.: US 8,562,284 B2
(45) Date of Patent: Oct. 22, 2013

(54) PROPULSIVE FAN SYSTEM

(75) Inventor: Stephen J. Bradbrook, Bristol (GB)

(73) Assignee: Rolls-Royce PLC, London (GB)

( * ) Notice: Subject to any disclaimer, the term of this patent is extended or adjusted under 35 U.S.C. 154(b) by 618 days.

(21) Appl. No.: 12/776,765

(22) Filed: May 10, 2010

(65) Prior Publication Data
US 2010/0329844 A1 Dec. 30, 2010

(30) Foreign Application Priority Data

Jun. 29, 2009 (GB) .................................. 0911100.6

(51) Int. Cl.
*F01D 1/24* (2006.01)
*F03D 3/02* (2006.01)
*F04D 13/04* (2006.01)

(52) U.S. Cl.
USPC ............. 415/68; 416/125; 416/128; 416/129

(58) Field of Classification Search
USPC ........ 60/226.1; 415/61, 66, 68; 416/124, 125, 416/128, 129; 440/75
See application file for complete search history.

(56) References Cited

U.S. PATENT DOCUMENTS

| | | | | |
|---|---|---|---|---|
| 1,244,480 A | * | 10/1917 | Dieterich | 416/124 |
| 1,482,381 A | * | 2/1924 | Cake | 416/129 |
| 3,153,907 A | * | 10/1964 | Griffith | 60/39.15 |
| 3,997,131 A | * | 12/1976 | Kling | 244/23 R |
| 4,446,696 A | * | 5/1984 | Sargisson et al. | 60/226.3 |
| 4,738,589 A | * | 4/1988 | Wright | 416/127 |
| 5,221,048 A | * | 6/1993 | Lair | 239/265.37 |
| 5,692,372 A | * | 12/1997 | Whurr | 60/226.1 |
| 6,053,782 A | | 4/2000 | Jordan | |
| 7,854,582 B2 | * | 12/2010 | Ullyott | 415/1 |
| 2005/0198941 A1 | | 9/2005 | Bart et al. | |

FOREIGN PATENT DOCUMENTS

| | | |
|---|---|---|
| EP | 1 777 369 A2 | 4/2007 |
| GB | 1 229 007 | 4/1971 |
| GB | 2 435 076 A | 8/2007 |

OTHER PUBLICATIONS

Oct. 29, 2009 Search Report issued in GB 0911100.6.

* cited by examiner

*Primary Examiner* — Edward Look
*Assistant Examiner* — Christopher J Hargitt
(74) *Attorney, Agent, or Firm* — Oliff and Berridge, PLC

(57) ABSTRACT

A propulsive fan system comprises a fan unit comprising a first stage array of rotatable blades upstream of a second stage array of rotatable blades. The first stage is coupled to a first drive means. The second stage is coupled to a second drive means. The first drive means is independently operable of the second drive means during operation of the fan system.

13 Claims, 2 Drawing Sheets

PROPULSIVE FAN SYSTEM

The present invention relates to a propulsive fan system.

In particular the invention is concerned with a fan system for producing propulsive thrust for a vehicle.

It is known to propel a variety of air, land and sea vehicles using a fan unit which generates thrust, where the fan unit is coupled to an independent power unit, such as an internal combustion or a gas turbine turboshaft engine. Some air vehicles employ propulsive fans for vertical take off and landing. Such fan units may incorporate two or more stages of rotatable arrays of fan blades which are linked by a gearbox such that they rotate at a fixed ratio of speeds relative to one another.

The pressure ratio generated by the stages of fan blades is primarily a function of the drive speed. When the drive speed is reduced then both fan pressure ratio and fan non-dimensional mass flow will reduce. If a substantial change of thrust is required from the fan unit then, in order to maximise fan efficiency, it is preferable to reduce fan pressure ratio whilst maintaining constant non-dimensional mass flow. With many power units, such as gas turbine engines, it is preferable for the power unit to maintain a relatively constant rotational speed, which is in conflict with the requirement to alter the fan rotor speed.

Hence a fan system which is operable to balance these operational requirements, thereby producing varying propulsive thrust whilst maintaining fan and power unit efficiency, is highly desirable.

SUMMARY OF THE INVENTION

Accordingly there is provided a propulsive fan system comprises a fan unit comprising a first stage array of rotatable blades upstream of a second stage array of rotatable blades, and the first stage is coupled to a first drive means, and the second stage is coupled to a second drive means, wherein the first drive means is independently operable of the second drive means during operation of the fan system.

The operational rotatable speed of the first and second stage arrays may be adjustable relative to one another during operation of the fan system.

The propulsive fan system may be configured such that during operation of the fan system the fan pressure ratio may be varied whilst maintaining a constant non-dimensional mass flow through the fan system.

This provides the advantage of a fan unit where each fan stage is independently powered and controlled, thereby allowing the fan pressure ratio to be substantially varied whilst maintaining fan non-dimensional mass flow in such a manner as to optimise the efficiency of the propulsion system.

BRIEF DESCRIPTION OF THE DRAWINGS

Embodiments of the invention will now be described with reference to the accompanying drawings, in which.

DETAILED DESCRIPTION OF EMBODIMENTS

Figure 1:
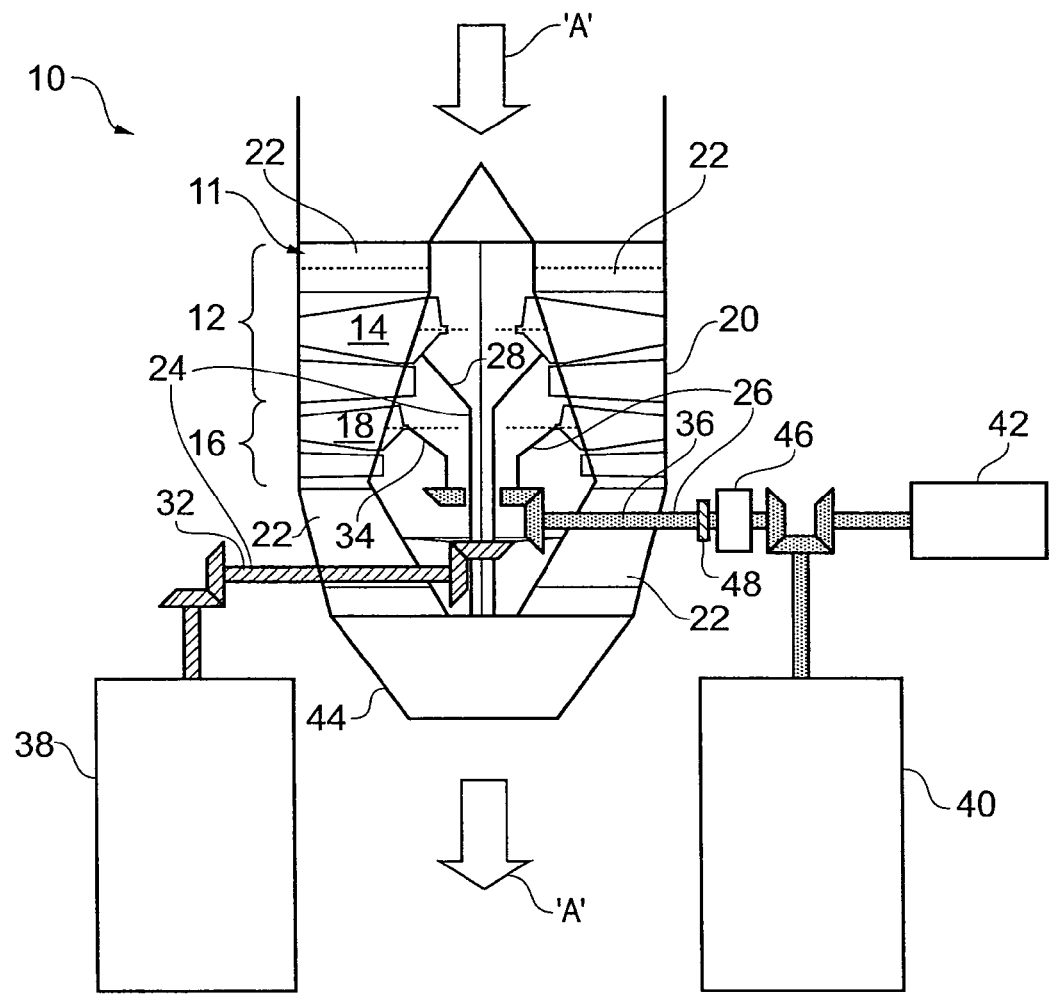
FIG. 1 shows a first embodiment of a propulsion system according to the present invention.

FIG. 1 shows a first embodiment of a propulsive fan system 10 according to the present invention. The propulsive fan system 10 comprises a fan unit 11 comprising a first stage array 12 of rotatable blades 14 upstream of a second stage array 16 of rotatable blades 18. A casing 20 is disposed around the arrays 12,16 to define a flow path 22 for a fluid (for example air) to pass through in the direction shown by arrow "A". For the avoidance of doubt, the term "fan system" is used to refer to the whole system, whereas the term "fan unit" refers to the structure encompassed by the casing 20. The arrays 12,16 are rotatably mounted independently of one another. The first stage 12 is coupled to a first drive means 24, and the second stage 16 is coupled to a second drive means 26. In this example the drive means 24,26 are provided as shafts and gear mechanisms. The first array 12 is mounted on a first support shaft 28, which engages with a first drive shaft 32 that extends through the casing 20 to outside of the fan unit 11. The second array 16 is carried on a second support shaft 34, which engages with a second drive shaft 36 that also extends through the casing 20 to outside of the fan unit 11. The first support shaft 28 extends through a hollow cavity in the second drive shaft 34.

The first drive shaft 32 of the first drive means 24 is coupled to a first power unit 38. The second drive shaft 36 of the second drive means 26 is coupled to a second power unit 40. Optionally, the second drive shaft 36 of the second drive means 26 is additionally coupled to an auxiliary power unit 42 via a first clutch 46 incorporated in the second drive means 26.

In an alternative embodiment (not shown) the first drive shaft 32 is coupled to an auxiliary power unit 42 via a first clutch 46 incorporated in first drive means 24.

In a further alternative embodiment (not shown), both the first drive shaft 32 and second drive shaft 36 are coupled to an auxiliary power unit 42 via a first clutch 46 incorporated in their respective drive means 24,26.

The propulsive fan system 10 is configured such that the first drive means 24 is independently operable of the second drive means 26 such that the operational rotatable speed of the first stage array 12 and second stage array 16 are adjustable relative to one another during operation of the fan system 10. Thus the first stage array 12 and second stage array 16 are operable to rotate simultaneously and independently, and their operational relative rotational speed can be varied during operation of the fan system 10.

At least one of the arrays 12,16 comprises a means for locking 48 it into a non rotatable configuration while the other array 12,16 is rotating. The locking means 48 may be provided as a mechanical brake on one of the support or drive shafts. Alternatively the locking means 48 may be provided as a brake within the respective power unit 38,40,42. The first clutch 46 enables the auxiliary power unit 42 to remain engaged with the respective power unit 38,40 when the respective fan stage 12,16 has been stopped.

The fan unit 11 further includes a variable area exhaust nozzle 44 operable to be variable in area in dependence upon the operational state of the first and second blade arrays 12,16.

Figure 2:
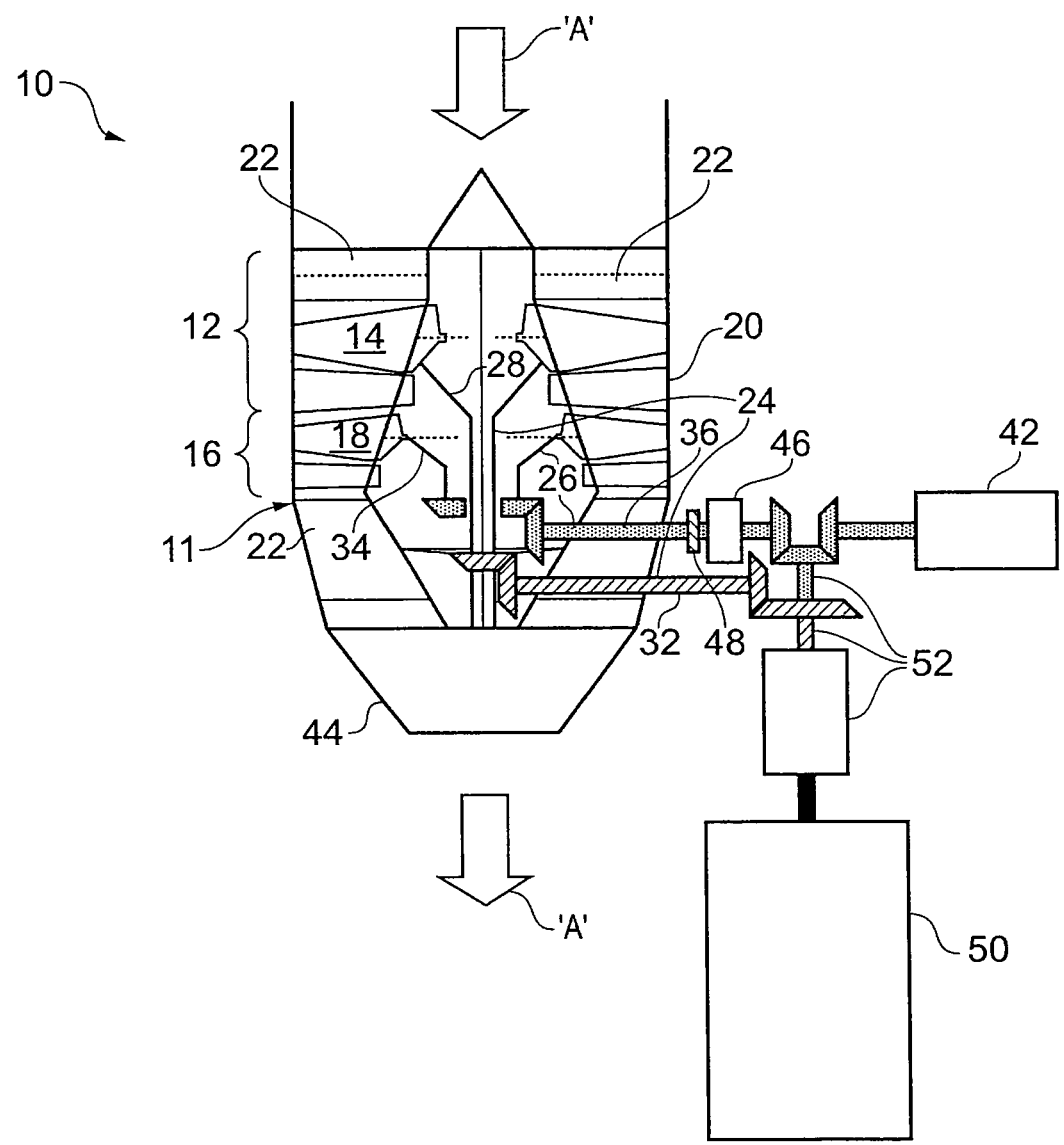
FIG. 2 shows a second embodiment of a propulsion system according to the present invention.

A second embodiment of a propulsive fan system 20 according to the present invention is shown in FIG. 2. Details of the fan and drive means 24,26 are as described with respect to the first embodiment of FIG. 1, and hence share common reference numerals. However, in this embodiment, the first support shaft 28 and first drive shaft 32 of the first drive means 24, and the second support shaft 34 and second drive shaft 36 of the second drive means 26, are both coupled to common power unit 50 via a second clutch and gear means 52, configured such that the first drive means 24 is independently operable of the second drive means 26 such that the operational rotatable speed of the first stage array 12 and second stage array 16 are adjustable relative to one another. Optionally, and as shown in FIG. 2, the second drive shaft 36 of the second drive means 26 is additionally coupled to an auxiliary power unit 42, with a first clutch 46 incorporated in the drive means 26 to enable the auxiliary power unit 42 to continue to be driven when the second fan stage 16 is not being powered.

In an alternative embodiment (not shown) the first drive shaft 32 of the first drive means 24 is also coupled to the auxiliary power unit 42.

The propulsive fan system 10, 20 may be incorporated in any vehicle requiring propulsive thrust. In one example it is included on an aircraft to provide thrust for vertical and short take off and landing (VSTOL), and thrust for forward flight.

In lift mode, eg jet-borne take-off, hovering and landing, where the maximum static thrust is required, power is supplied to both fan stages 12,16 via the drive means 24,26 in order to achieve the maximum fan pressure ratio and hence maximum thrust.

In wing-borne cruising flight, considerably less thrust is required because of the amount of lift generated by the airframe of the aircraft. At subsonic speeds, and depending on flight condition, it is also advantageous to reduce the propulsion jet velocity and hence fan pressure ratio in order to improve propulsive efficiency and hence reduce fuel consumption.

With reference to the first embodiment shown in FIG. 1, this is achieved by removing or substantially reducing the power to one of the two fan stages 12,16 thereby reducing the fan pressure ratio. For example, if it is required to reduce power to the second stage 16, the power unit 40 powering the second stage 16 is switched off, and the locking means 48 is engaged to stop rotation of the second stage 16 to prevent the second stage 16 windmilling. It is advantageous to prevent wind milling because windmilling results in additional drag and hence reduces the efficiency of the propulsion system 10,20. The first power unit 38 remains operational to drive the first fan stage 12. Alternatively, the first stage array 12 and power unit 38 may be powered down so that all thrust is produced by the second stage array 16 powered by the second power unit 40.

With reference to the second embodiment shown in FIG. 2, operation is similar, except instead of switching off a power unit, the first clutch 46 or second clutch and gear mechanism 52 are used to disengage the relevant drive shaft 32,36 from the power unit 50.

Generating all the power required for normal wing-borne flight from a single power unit means the operating power unit can be operated at its optimum working setting. In an embodiment where the power units 38,40,50 are gas turbine engines, the engine operates at a higher throttle setting than if two power units 38, 40 are operational, since there is a larger power demand to be fulfilled. This increases efficiency and hence reduces fuel consumption of the operating power unit.

If there is a requirement for a substantial increase in wing-borne thrust, eg for high speed dash, then it is possible to power both fan stages 12,16 thereby increasing fan pressure ratio and hence thrust.

In order to match changes in exhaust pressure ratio generated by the variations in thrust from the fan stage 12,16, the variable area exhaust nozzle 44 will open and close in dependence upon the operating condition of the fan stages 12,16. For example it will have a relatively small area during high thrust, due to the higher pressure in the exhaust, and a relatively large area at low thrust.

With respect to the FIG. 1 configuration with the auxiliary power unit 42 provided as a motor/generator, when one of the first or second arrays 12,16 is not being driven, the respective power unit may be dis-engaged from the fan via the first clutch 46 to allow the power unit to continue to actuate the generator 42 to provide electrical power to systems on board the vehicle to which the propulsive fan system 10 is attached.

With respect to the FIG. 2 configuration with the auxiliary power unit 42 provided as a motor/generator, the power unit 50 may be engaged and disengaged with the motor/generator 42 to provide electrical power to on board systems as required. The first clutch 46 permits the power unit 50 to be engaged with the motor/generator 42 when the second stage array 16 is not being driven.

During take-off, hovering and landing the auxiliary power unit 42 may be used to input mechanical power to the second stage fan 12, 16 to which it is coupled and engaged.

The advantage of systems according the present invention is that a single fan unit can be used to provide thrust for vertical and short take-off and landing aircraft in all modes of flight thereby obviating the need for multiple fan units, and hence reducing the mass of the overall system. The fan pressure ratio of the propulsive fan unit can be changed significantly during operation of the fan system whilst maintaining the same non-dimensional mass flow through the flow path 22 and optimising power unit efficiency.

The power units 38, 40, 42, 50 may be any device which is capable of rotating the drive shafts with the required torque at the required speed. They may be electric motors powered by a remote engine or powered by a battery. The auxiliary power unit 42 may be provided as an electric motor/generator, which in one mode of operation is actuated by one of the power units 38,40,50 to generate electricity, but in a different mode of operation is electrically powered to act as a motor. Alternatively the power units 38, 40, 42, 50 may be internal combustion engines, such as reciprocating engines or gas turbine engines, or some combination thereof. The power units 38, 40, 42, 50 may have their own means of air intake and exhaust separate to the propulsive fan unit 11.

In order to direct the thrust in the correct direction for both jet-borne flight, eg during take-off, hover or landing, and also wing-borne flight, the propulsive fan system of the present invention may be included on a number of different aircraft configurations. In a 'tail-sitter' aircraft, where the aircraft lands and rests vertically, the whole aircraft would rotate to change the direction of thrust from vertical to horizontal. In another arrangement, the fan unit as a whole could be rotated, eg mounted on the wing tips, whilst the power units either rotate with the fan units or remain fixed within the aircraft. In another arrangement, both the fan unit and the power units remain fixed with the aircraft and the direction of thrust is varied by the use of vectoring propulsion nozzles fed from the exhaust of the fan unit.

The invention could be used to provide a means of varying the fan pressure ratio of the propulsive system for a conventional wing-borne aircraft thereby allowing the efficiency of the propulsive system to be optimised for a range of differing flight conditions, eg take-off, high speed dash and low speed loiter.

The invention claimed is:

1. A propulsive fan system comprises a fan unit comprising:
   a first stage array of rotatable blades coupled to a first drive means;
   a second stage array of rotatable blades coupled to a second drive means, wherein:
      the first stage array of rotatable blades are upstream of the second stage array of rotatable blades, and
      the first drive means is independently operable of the second drive means during operation of the fan system; and a variable area exhaust nozzle operable to be variable in area in dependence upon an operational state of the first stage array of rotatable blades and the second stage array of rotatable blades, wherein at least one of the first stage array of rotatable blades and the second stage array of rotatable blades comprises means for locking the at least one of the first stage array of rotatable blades and the second stage array of rotatable blades into a non-rotatable configuration while the other of the first stage array of rotatable blades and the second stage array of rotatable blades is operable to rotate.

2. A propulsive fan system as claimed in claim 1 wherein an operational rotatable speed of the first stage array of rotatable blades and the second stage array of rotatable blades are adjustable relative to one another during operation of the fan system.

3. A propulsive fan system as claimed in claim 2 wherein, during operation of the fan system, a fan pressure ratio may be varied whilst maintaining a constant non-dimensional mass flow through the fan system.

4. A propulsive fan system as claimed in claim 1 wherein the first stage array of rotatable blades and the second stage array of rotatable blades are operable to rotate simultaneously.

5. A propulsive fan system as claimed in claim 1 wherein each of the first and second drive means are coupled to at least one power unit.

6. A propulsive fan system as claimed in claim 5 wherein the first and second drive means are coupled to a common power unit.

7. A propulsive fan system as claimed in claim 6 wherein the first and second drive means are coupled to the common power unit via a clutch and gear means.

8. A propulsive fan system as claimed in claim 5 wherein the first drive means is coupled to a first power unit, and the second drive means is coupled to a second power unit.

9. A propulsive fan system as claimed in claim 8 wherein at least one of the drive means is additionally coupled to an auxiliary power unit.

10. A propulsive fan system as claimed in claim 5 wherein at least one power unit is an electric motor.

11. A propulsive fan system as claimed in claim 5 wherein at least one power unit is an internal combustion engine.

12. A vehicle comprising a propulsive fan system as claimed claim 1.

13. A vehicle as claimed in claim 12 wherein each of the first and second drive means are coupled to at least one power unit and wherein any power unit is operable to supply vehicle systems with power.

* * * * *